United States Patent
Nguyen et al.

(10) Patent No.: US 11,336,468 B2
(45) Date of Patent: May 17, 2022

(54) SYNTHETIC PHYSICALLY UNCLONABLE FUNCTION

(71) Applicant: SECURE-IC SAS, Cesson-Sevigne (FR)

(72) Inventors: Philippe Nguyen, Rennes (FR); Robert Nguyen, Boulogne Billancourt (FR); Youssef Souissi, Massy (FR); Sylvain Guilley, Paris (FR); Jean-Luc Danger, Antony (FR); Adrien Facon, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 175 days.

(21) Appl. No.: 16/470,209

(22) PCT Filed: Dec. 20, 2017

(86) PCT No.: PCT/EP2017/083723
§ 371 (c)(1),
(2) Date: Jun. 15, 2019

(87) PCT Pub. No.: WO2018/115068
PCT Pub. Date: Jun. 28, 2018

(65) Prior Publication Data
US 2020/0092116 A1 Mar. 19, 2020

(30) Foreign Application Priority Data
Dec. 21, 2016 (EP) .................................... 16306765

(51) Int. Cl.
*H04L 9/32* (2006.01)
*G06F 21/44* (2013.01)
(Continued)

(52) U.S. Cl.
CPC ............ *H04L 9/3278* (2013.01); *G01R 29/26* (2013.01); *G06F 21/44* (2013.01); *H04L 9/0866* (2013.01);
(Continued)

(58) Field of Classification Search
CPC ... H04L 9/3278; H04L 9/0866; H04L 9/0869; H04L 2209/12; G01R 29/26; G06F 21/44; G09C 1/00
(Continued)

(56) References Cited

U.S. PATENT DOCUMENTS 5,606,488 A * 2/1997 Gustafson ........ G06K 19/07749
235/487
8,525,169 B1 9/2013 Edelstein et al.
(Continued)

FOREIGN PATENT DOCUMENTS

CN 104 155 997 A 11/2014
FR 3 026 253 A1 3/2016
WO 2007/069190 A2 6/2007

OTHER PUBLICATIONS

Maiti, et al., "The Impact of Aging on a Physical Unclonable Function", IEEE Transactions on Very Large Scale Integration (VLSI) Systems, vol. 22, Issue 9, pp. 1854-1864, Sep. 1, 2014.
(Continued)

Primary Examiner — Giovanni Astacio-Oquendo
(74) Attorney, Agent, or Firm — BakerHostetler

(57) ABSTRACT

A circuit for a Synthetic Physically Unclonable Function, acronym SPUF, in a computer device, wherein the circuit is
(Continued)

configured to receive data from a plurality of hardware sensors and/or actuators accessible in the computer device; to determine deviations in the data; to determine a multivariate distribution of the deviations and to determine an identifier from the multivariate distribution. In described developments, deviations comprise random errors, statistical moments in data originating from sensors and/or actuators amongst accessible ones in the computer device can be selected, and entropy can be maximized. Computer program product embodiments are described.

18 Claims, 2 Drawing Sheets

(51) Int. Cl.
    *H04L 9/08*        (2006.01)
    *G01R 29/26*     (2006.01)

(52) U.S. Cl.
    CPC ........ *H04L 9/0869* (2013.01); *H04L 2209/12* (2013.01)

(58) Field of Classification Search
    USPC .......................................... 324/613, 612, 600
    See application file for complete search history.

(56) References Cited

U.S. PATENT DOCUMENTS

| | | | |
|---|---|---|---|
| 10,423,184 B1* | 9/2019 | Gutierrez | H05K 7/1498 |
| 2004/0044499 A1* | 3/2004 | House | H02P 29/02 |
| | | | 702/181 |
| 2008/0262788 A1* | 10/2008 | Schrijen | H04L 9/0866 |
| | | | 702/155 |
| 2012/0257653 A1* | 10/2012 | Nagaishi | H01Q 3/2682 |
| | | | 375/219 |
| 2013/0089991 A1* | 4/2013 | Ito | H01R 13/6587 |
| | | | 439/65 |
| 2013/0113499 A1* | 5/2013 | Golt | G01N 27/041 |
| | | | 324/600 |
| 2017/0310688 A1 | 10/2017 | Lecomte et al. | |
| 2018/0314920 A1* | 11/2018 | Cai | G06K 9/6251 |

OTHER PUBLICATIONS

Van Den Berg, et al., "Entropy analysis of Physical Unclonable Functions".

Van Den Berg, et al., "Entropy analysis of Physical Unclonable Functions", Aug. 31, 2012.

* cited by examiner

SYNTHETIC PHYSICALLY UNCLONABLE FUNCTION

CROSS-REFERENCE TO RELATED APPLICATIONS

This application is a National Stage of International patent application PCT/EP2017/083723, filed on Dec. 20, 2017, which claims priority to foreign European patent application No. EP 16306765.5, filed on Dec. 21, 2016, the disclosures of which are incorporated by reference in their entirety.

TECHNICAL FIELD

This invention generally relates to the field of digital data processing and more particularly to methods and systems for handling a Physically Unclonable Function.

BACKGROUND

A Physically Unclonable Function (referred to by the acronym PUF or PUFs in plural form) can be used in various contexts (e.g. authentication of chips or goods it is attached to, generation of cryptographic keys or seeds of PRNG).

A PUF is a physical entity which is embodied in a physical structure and which is the same in each physical instantiation of the structure.

A PUF generates a specific output or response when provided with an input, or challenge. The value of said specific output being specific to each instantiation of the physical entity embodied within a device. A PUF takes advantage of the variance of conditions in the manufacturing process of many identical devices. To some extent, a PUF may be considered as the analog of a fingerprint of the device.

In particular, a PUF is a physical function (not a mathematical function) which maps a digital "challenge" to a digital "response" (i.e. a "Challenge and Response Pair", acronym CRP). A challenge is a vector of bits. Running a PUF with a set of challenges produces a unique and non-predictable set of responses. It is required that the PUF yields a deterministic answer for the same challenge. This determinism might be flawed by noise as the exploited phenomenon comes from physical sources (for example slight differences between logic gates).

Conventional approaches are known that describe useful properties to be met by PUFs in particular applications, such as:
  Steadiness/Reliability referring to the property that a response for a given input is replied in a deterministic manner. This property is not only a safety property. Indeed it is also a security issue as an unreliable PUF can accidentally provide the output of another PUF;
  Randomness/Unpredictability referring to the property that PUFs responses are not predictable, as would be with a serial number, incremented for each device;
  Uniqueness referring to the property that instances of PUFs differ;
  Diffuseness referring to the property that the PUF's response to a challenge is unrelated to the challenge, e.g., it is hard to infer an answer from a set of known challenge response pairs. This property concerns specifically "strong PUFs".

Existing PUFs include:
  PUF constructions consisting of electrical and/or electronic building blocks whose response generation is mainly based on analog measurements (e.g. Coating PUFs)
  Digital intrinsic PUFs which are embedded on an integrated circuit (IC) device (also called "silicon-PUFs") and which are based on building blocks formed by regular digital primitives for the considered manufacturing technology.

Existing PUFs have limitations.

There is accordingly a need for advanced Physically Unclonable Function (PUF) circuits and methods.

SUMMARY

There is disclosed a circuit for a Synthetic Physically Unclonable Function, acronym SPUF, in a computer device, wherein the circuit is configured to receive data from a plurality of hardware sensors and/or actuators accessible in said computer device; to determine deviations in said data; to determine a multivariate distribution of said deviations and to determine an identifier from said multivariate distribution. In some developments, deviations comprise random errors, statistical moments in data originating from sensors and/or actuators amongst accessible ones in the computer device can be selected, and entropy can be maximized. Computer program product embodiments are described.

Advantageously, the invention provides a "synthetic" PUF (SPUF) derived from the outputs of one more sensors (and/or actuators). In some embodiments, a SPUF can be determined from a single sensor (for example a 3D sensor can be associated with three independent parameters; each of the three parameters may be potentially exploited or used by embodiments of the invention).

Advantageously, embodiments of the Synthetic PUF according to the invention can be applied to identify a computer device (e.g. comparing collected identifiers) or to generate a secret key intrinsic to said computer device.

Advantageously, some embodiments of the invention can use and leverage the "dispersion" of systematic errors/intrinsic noise existing in sensors to obtain such a "synthetic" PUF.

Advantageously, some embodiments of the invention can leverage the presence of digital sensors in a computing device to determine an identifier ("ID"). By design, such an identifier is generally unique and its determination can be made reproducible. For authentication purposes, identifiers can be further compared one against another (e.g. published, shared, etc).

Advantageously, embodiments of the invention along one or more SPUFs can use (in addition or in combination) one or more standard (i.e. known or classical) PUFs (e.g. a MEMS-based PUF, a silicon PUF, a coating PUF or an optical PUF).

Advantageously, the sensitivity to noise (or random errors) of one or more sensors can be leveraged according to the invention (by contrast, in the state of the art, noise is considered as a drawback because it negatively impacts reliability).

Advantageously, the amount of reliability of the synthetic PUF according to the invention can be quantified (i.e. measured and further exploited or leveraged).

Advantageously, some embodiments of the invention allow using a combination of PUF devices and/or sensors, which are today considered as not sufficiently "reliable". In case of insufficient reliability, the dispersion characteristics of several such measurements performed by said sensors or devices can be combined. In some embodiments, the noise of the measured quantity can be a reliable per-device signature.

Advantageously, embodiments of the invention can combine a plurality of sensors, thereby improving calibration and/or one or more of the resulting SPUF properties (e.g. maximizing entropy).

Advantageously, some embodiments of the invention can be performed at the factory and/or on commercialized circuits. Embodiments can be performed online and/or offline.

Advantageously, embodiments of the invention leverage the presence of embedded and accessible sensors (e.g. in a smartphone). The invention does not require additional hardware integration and/or modification of existing hardware, thereby does not increase manufacturing or operational costs.

Advantageously, some embodiments of the invention do not require a long characterization phase (e.g. compared to the one of a "standard" PUF)

Advantageously, some embodiments of the invention do not require holding secret keys in a static and/or centralized manner (e.g. embedded in a memory unit which can be attacked). By contrast, according to the invention, secrets can be distributed in an existing computing device.

Advantageously, embodiments of the invention allow for reproducible measures (by contrast existing approaches, for example combining tracking-based sensors, fail to propose reproducible measures).

Advantageously, embodiments of the invention manipulate noise profiles of sensors, in a sophisticated manner, while known approaches merely focus on the deviation of a sensor (which is behind a fabrication error).

Advantageously, embodiments of the invention take into account the whole environment surrounding the selected combination of sensors and/or actuators (for example, the way a sensor is soldered on PCB).

Advantageously, embodiments of the invention can be based on direct measurements (and not necessarily on differential ones, which can lead to several measurement errors).

Advantageously, embodiments of the invention enable user-friendly interfaces. For example, in an embodiment, a first measure is performed with the front side of a device (such as smartphone) facing a flat surface (such as a table), then a second measure is performed after flipping the device on its back side.

Advantageously, some embodiments of the invention enable applications such as digital signature generation, secret key generation, authentication, or an "anti-cloning" solution.

Advantageously, embodiments of the invention allow protecting privacy and sensitive data. Advantageous embodiments include secure login to a mobile website (e.g. email account, social account, banking account, etc), signature of emails and documents, mobile payment (e.g. cryptocurrency or money transactions), and authentication of Internet of Things devices (e.g. smartwatches, smartphones, smart-meters), healthcare applications, automotive applications (e.g. cars door controlling), logistics and supply chain management (e.g. for electronic devices) applications, machine-to-machine communications (M2M), robotics or domotics.

BRIEF DESCRIPTION OF DRAWINGS

Embodiments of the present invention will now be described by way of example with reference to the accompanying drawings in which like references denote similar elements, and in which.

DETAILED DESCRIPTION

Figure 1:
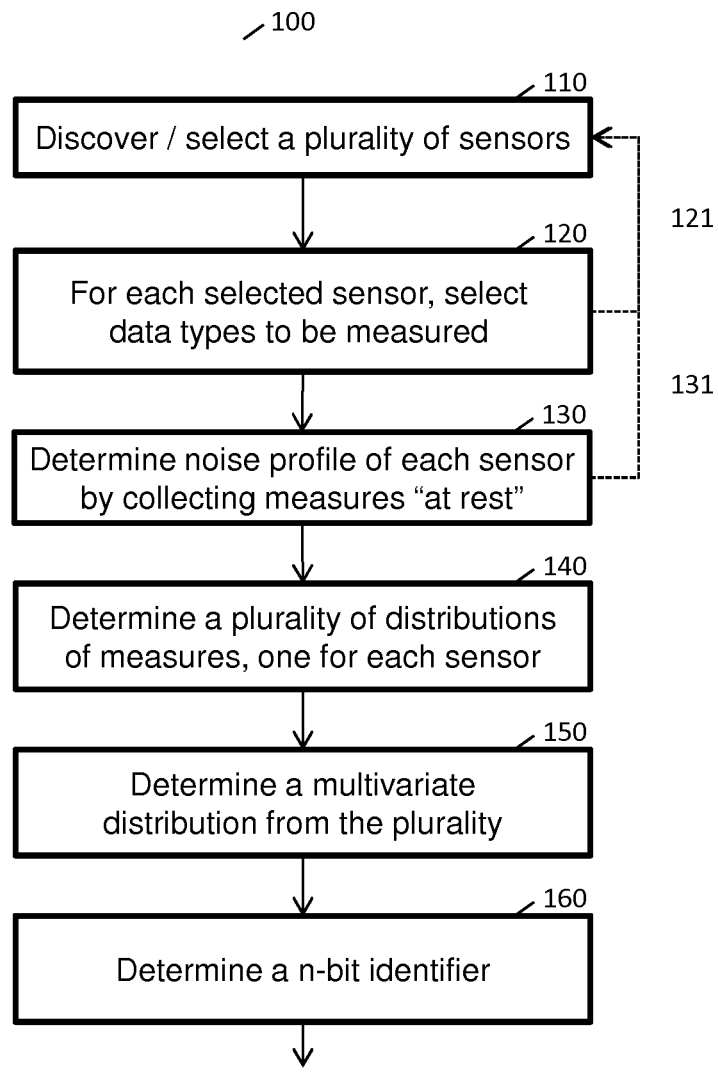
FIG. 1 illustrates examples of steps of the method according to the invention.

Embodiments of the invention provide a circuit for (emulation or implementation of) a "Synthetic" Physically Unclonable Function in a computer device, the circuit being configured to: —receive data from at least one hardware sensor (and/or actuators), possibly many, said sensors (associated with actuators) being for example accessible in said computer device; —determine deviations in the data; —determine a multivariate distribution of the deviations.

In an embodiment, the circuit is further configured to determine an identifier from said multivariate distribution. Such an identifier can be used for different purposes (e.g. for secret key generation, or to authenticate or identify a device if identifiers can be further compared)

In an embodiment, deviations comprise systematic errors.

The term of "deviation" encompasses the aggregation of "systematic" errors and of "random" errors. Deviations can be classified into systematic and random errors. Embodiments of the invention advantageously leverage systematic errors (which can indeed be manipulated as useful information).

In an embodiment, deviations comprises intrinsic noise.

To facilitate the understanding of embodiments of the invention, a definition of terms used in relation with such embodiments are provided below.

As used herein, the envisioned "computing device" or "computer device" comprising the sensors and/or actuators manipulated by the invention can be a smartphone. However, alternatively the computing/computer device can be any consumer electronics device (e.g. laptop, smart watch, virtual reality or augmented reality device, game console, television, etc) or any Internet of Things (IoT) device as well (for example smart meters in domotics; mecatronics components in automotive; medical devices or components in healthcare; elements for infrastructure e.g. smart city, transportation, logistics; banking devices in finance; etc)

A plurality of "sensors and/or actuators" can be used to design a "synthetic" PUF according to the invention (SPUF). The expression "sensors and/or actuators" can be simplified into "sensors" in the further description.

A "sensor" is an object or a device whose purpose is to detect events or changes in its environment, and then provide a corresponding output. A sensor presents deviations. If the sensor is not ideal, several types of deviations can be observed. In particular, noise is a random deviation of the signal that varies in time.

A sensor according to embodiments of the invention can be one or more of a pressure sensor, ultrasonic sensor, humidity sensor, gas sensor, motion sensor, acceleration sensor or accelerometer, displacement sensor, force measurement sensor, gyro sensor or gyroscope, temperature sensor, image sensor, video sensor, U.V. sensor, magnetic sensor, CMOS image sensor, a silicon microphone, Inertial Measurement Unit (IMU), pressure sensor, micro-mirror, radiofrequency sensor, magnetic field sensor, digital compass, oscillator, luxmeter or light sensor, proximity sensor, G.N.S.S. (e.g. G.P.S.), barometer sensor, Wifi sensor, Bluetooth sensor, NFC sensor, pedometer, pulse oximetry sensor, heart rate sensor, fingerprint sensor.

An "actuator" refers to a component which is responsible for moving and/or controlling a mechanism or system. An actuator requires a control signal and a source of energy. An actuator also can be a source of data (either directly or indirectly via a coupled sensor), which can be manipulated by embodiments of the invention (as data stemming from one or more sensors). An actuator is generally used with at least one sensor. In other words, a sensor can be excited by an actuator.

An "actuator" according to the invention can be one of the elements selected in the group consisting of a motor (e.g. electric, piezoelectric, stepper), an autofocus actuator, a micro-speaker, a micro-mirror, an electro-active polymer, a servomechanism, a shape-memory alloy, a haptic component (e.g. vibratile), etc.

Sensors (respectively actuators) as used herein can be M.E.M.S. sensors, but not necessarily. MEMS sensors generally have unique fingerprint based on inherent variability in silicon manufacturing processes. MEMS sensors are widely available and used in consumer electronics. MEMS sensors can have very different features and their behaviors can be hard to model. Sensors are always prone to irreducible "random physical disorders", i.e. uncontrollable and unpredictable manufacturing variations that occur in almost all physical systems on small length scales (due to manufacturing and material imperfections as well as environmental factors which cannot be excluded entirely). MEMS-based sensors, despite their promising improvements, also present random errors and will continue to do so. At the same time, the increasing adoption of this technology can broaden the possibilities of designs of SPUFs according to the invention.

MEMS sensors (or actuators), which can be used in some embodiments of the invention comprise antilock brakes accelerometer, mass air flow, sun/light sensor, load sensor, force sensor, ink jet print head, camera lens, RW head, micro-display, Lab-On-a-Chip, drug delivery system, inertial sensor, optical switch, micro spectrometer, bulk micro machined pressure sensor, blinking bubble pump, Pirani vacuum gauge, micro channel resonant mass sensor, enzyme based blood analysis, MEMS based paper handler, flow sensor, digital light projector, variable-focus liquid lens, tunable Fabry-Perot filter, adaptive mirror, bolometer imaging array, 1 GHz resonator, switch, silicon oscillator, neural probes, data storage devices, inductor coil, tuning fork gyroscope, etc.

MEMS sensors can be of different generations (in 1st generation, a MEMS sensor element is mostly based on a silicon structure, sometimes combined with analog amplification on a micro chip; in 2nd generation, a MEMS sensor element can be combined with analog amplification and analog-to-digital converter on one micro chip; in 3rd generation, the sensor element is fusioned with analog amplification, analog-to-digital converter and digital intelligence for linearization and temperature compensation on the same micro chip; in 4th Generation, memory cells for calibration—and temperature compensation data are added to the elements of the 3rd MEMS sensor generation).

Sensors and actuators can be associated (or linked or interlinked or coupled or combined). For example, an actuator can excite a sensor. A sensor can monitor an actuator (e.g. a sensor measuring displacement can monitor an autofocus mechanism). A sensor can control an actuator. An actuator can control a sensor. An actuator and a sensor can interact (bidirectional relationship). Because they interact with the environment (by definition), actuators can be affected by extrinsic noise (e.g. physical placement on a PCB).

If a sensor (or an actuator) is not ideal, several types of deviations can be observed. Such deviations can be classified as "systematic errors" or "random errors".

Systematic errors comprise offsets or bias, dynamic errors, drifts, hysteresis, digitization errors, aliasing errors, etc. Systematic errors can sometimes be compensated by calibration.

Random errors in experimental measurements are caused by unknown and unpredictable changes in the experiment. These changes may occur in the measuring instruments or in the environmental conditions. "Noise" designates a random deviation of the signal that varies in time. Noise is a random error that can be reduced by signal processing, such as filtering, usually at the expense of the dynamic behavior of the sensor. Noise or noise profiles can be characterized, and be further leveraged by the present invention.

Noise of a device can be divided into "extrinsic" noise (e.g. noise caused by surrounded components, sensor integration on PCB, etc) and into "intrinsic" noise (i.e. associated with the sensor on its own considered independently from its environment).

A "synthetic PUF" (or SPUF) designates a combination of sensors and/or actuators. The expression "synthetic PUF" hereinafter also can be referred to as "combined sensor system" or "super sensor system" or "meta-sensor system" or "virtual-assembly of sensor systems".

A (standard, i.e. known) PUF generally verifies several properties, and in particular the ones of reproducibility and uniqueness. The reproducibility property expresses that the PUF always returns a same response for a given input or stimulus, whatever the operational conditions can be. The uniqueness property expresses that the response of the PUF must return a unique response compared to all other (equivalent) PUFs. The uniqueness is related to the notion of available entropy. This available entropy can be theoretically estimated. Experimental tests can be performed to improve such estimation.

According to the invention, the entropy of the synthetic-PUF according to the invention can be enhanced by combining different sources/sensors. Increased entropy improves the uniqueness (i.e. it leads to a lower risk of collision).

Other classical properties of a (standard, i.e. known) PUF imply that a PUF must tentatively be as hard as possible to replicate, as hard as possible to mathematically model, and as tampered-proof as possible (e.g. modified or damaged or destroyed if analyzed). Versus these specific properties, a synthetic PUF according to the invention can also present advantages. For example, a SPUF can be rendered harder to replicate despite the standardization of components because the distribution of noise can be optimized to exploit the residual and irreducible defects of manufactured sensors. The mathematical modeling of the SPUF can be complexified, for example by increasing the number and types of sensors and/or actuators being combined. The tampered-proof situation can be improved, for example by exploiting the fact that the synthetic PUF is physically distributed (e.g. within the smartphone), thereby multiplying deactivation options (watchdogs or self/mutual surveillance mechanisms can be used).

In other words, using a combination of several sensors of different natures (in terms of underlying manufacturing technologies) allows decreasing the reproducibility of the combination (while current smartphones embed a few common sensors, many still have unique features and sensors). Knowing the number and types of sensors being used, the PUF-like device according to the invention can be theoretically reproduced but this knowledge is hard to obtain (and can be hardened). Measuring a PUF-like device may often prove easier than modeling it mathematically, in the absence of measure data. Regarding tampering aspects, using relatively expensive components may slow down attacks.

In a different perspective, the term "noise" encompasses the aggregation of "intrinsic" noise (due to the sensor and/or actuator) and of "extrinsic" noise (due to the environment). Embodiments of the invention advantageously leverage intrinsic noise.

A "deviation" (of a sensor) designates a "feature" or a "sensitivity property". Such a "sensitivity property" of a sensor exploits the "intrinsic noise" of said sensor (i.e. it "leverages" or "takes advantage thereof", in the framework of the invention). The "intrinsic noise" is associated with one or more physical variables, measured by said sensor. At least three types or categories of physical variables measured by sensors (comprising noise) can be used in embodiments of the invention: a) amplitude (value of the variable), b) time/frequency (evolution of the variable) and c) space (position of the variable, e.g. CMOS pixels).

A «systematic error» can be a «sensitivity property» in some specific cases (i.e. average value at first order). As used herein, the term "sensitivity property" is more general and, in its the broadest definition, designates how much the sensor's output changes when the input quantity being measured changes.

In an embodiment, the circuit may be further configured to select a combination of sensors and/or actuators amongst accessible ones in the computer device.

The circuit or method can "discover" the presence of the one or more sensors/actuators in the computer device. The method can be implemented in software which can be downloaded and installed on-the-fly in a device e.g. a smartphone. In such a case, the availability and accessibility of suitable sensors can be determined as a preliminary step. In an embodiment, different models of smartphones can be known or predefined and some best combinations of sensors can be known or predefined. The selection of sensors/actuators can use heuristics locally accessed and/or retrieved from a remote database.

The selection can be random. The selection can be performed pursuant to an objective, for example to reach an objective of entropy and/or reliability.

In an embodiment, the circuit may be further configured to select one or more sensitivity properties selected in one or more sensors and/or actuators.

"Sensitivity properties" or "features" (of sensors/actuators) comprise for example the time domain and/or frequency domain and/or space responses (of sensors/actuators). High-order statistics (i.e statistical moments) and big-data techniques, such as machine learning and/or data mining, can be applied to determine such features.

In an embodiment, the circuit may be further configured to select one or more statistical moments in distributions of data originating from one or more sensors and/or actuators.

Statistical moments, for example mean, variance, skewness or kurtosis (or any other higher order moments), can be selected separately or combined. The selection and/or combination can depend on multiple factors. Among these factors, a factor can consists in reaching a desired target SPUF global property. In some embodiments, the selection/combination can be provided through a weighted linear/or non linear function.

A plurality of sensors and/or actuators can be selected, amongst those accessible in the computing device. Even more generally, the selection can be performed at lower of finer granularity levels, i.e. by taking into account statistical moments of data streams stemming from sensors.

In some embodiments, the selection can be two-fold. The number and types of sensors/actuators can be adjusted so as to maximize entropy. Diving deeper into sensors/actuators, specific properties such as statistical moments of sensors/actuators can be leveraged. It can occur that a given sensor, which may appear at first uninteresting for use in a SPUF according to the invention, can in fact reveal to contain deep properties, which can be useful when considered in combination with other moments of other sensors. In other words, in some embodiment, the two selection steps can be handled independently, not necessarily successively. In some embodiments, selection steps can be performed concurrently. In some embodiments, one type of selection can influence the other one.

In an embodiment, the selection of sensors/actuators, and/or sensitivity properties thereof, maximizes data entropy.

Combining sensors/actuators allows or enables to increase the entropy of the global synthetic system and therefore to improve the uniqueness property of the SPUF.

Data entropy of a SPUF may be related to the variability between various instances synthetic PUFs, owing to their internal noise.

Instead of being considered as a disadvantage, entropy can be leveraged to enhance uniqueness or steadiness of an SPUF. In particular, the selection of sensors/actuators can be made so as to maximize data entropy. More generally, features (e.g. statistical moments in distributions, amplitude, frequency responses, etc) of sensors/actuators can be selected in order to maximize data entropy.

Entropy of a synthetic PUF can be determined or measured in different ways.

For a batch of PUFs (for example more than a hundred), values of responses can be measured i) in the same environmental conditions (to avoid as much as possible the systematic noise), and ii) repeatedly (as to allow an averaging which attenuates the external noise, relatively to the internal noise). Measured values can be subsequently sorted. Depending on the residual systematic and external noises, values can be clustered into classes (e.g. $2^n$ classes). For example, if the residual noise is null, the number of classes can equal to the number of unique values (i.e., "ties" can be counted as "one" class). If there is a large amount of noise (in which case the synthetic PUF has a poor reliability), a limited number of groups can be distinguished (with some probability of false classification). In practice and for example, the number of classes may be chosen as the closest integer to the ratio between the standard deviation of the values and the standard deviation of the residual noise. In such a case, the extracted entropy for such a PUF is the logarithm (in base two) of the number of classes. This extracted entropy can coincide with the number of bits which can be generated by the synthetic PUF.

Thresholds schemes can be applied. Exemplary steps are now described. For example, if the entropy is equal to one bit, two classes can be determined (e.g. determined by one threshold). A given SPUF whose response value would be below this threshold can generate a "zero", whereas another SPUF whose response value is above this threshold would generate a "one". If the entropy is equal to two bits, four classes can be determined. Advantageously, the same number of SPUF values can lie in each class. That is, one quarter (or quantile) of the values can be below a first threshold, a second quarter can be between this first threshold and a second threshold, a third quarter between the second and a third threshold, and finally the last quarter lies above the third threshold. The PUFs belonging to the first class can receive value "00"; those belonging to the second class receive value "01"; those belonging to the third class receive value "10"; and those belonging to the fourth class receive value "11". The process can be repeated iteratively for more bits of entropy.

To maximize entropy, two different "control points" can be used: the number/types of sensors/actuators being selected and the number/types of features being selected within a given sensor/actuator. The articulation between these two levels (device and statistical properties of devices) can be performed in different ways. Measures performed on a given sensor/actuator, hereinafter designated as "intra-class" optimization, can provide usable "features", isolating environmental influences for such a given sensor. Non-reliable features can thus be eliminated, offsets can be determined, etc. Hereinafter designated as "inter-class" optimization, considering a plurality of "identical" (off the shelf) sensors/actuators, it is possible to maximize the differences between to "identical" smartphones.

Implicit evaluation steps to determine entropy associated with the selection of sensors/actuators and/or sensitivity properties can draw temporary conclusions at the end of each selection type.

In an embodiment, the selection of sensors/actuators, and/or sensitivity properties thereof, may maximize reliability.

A (perfect or ideal) reliability of a PUF means in particular that the PUF returns the same response whatever the measurements and environmental conditions. The reliability of a PUF can be measured by a success rate. Such success rate returns a binary value that represents whether the response is good or wrong relatively to the enrollment state (i.e. expected value). Generally, the success rate should be high enough (close to 100%) to accept the PUF response. Otherwise, an error correction system can be appended or placed behind to improve the response.

In an embodiment, the (global) reliability of the SPUF can be maximized by adapting the selection/combination of sensors/actuators, and/or sensitivity properties thereof.

In an embodiment, selected sensors/actuators, and/or sensitivity properties thereof, are further weighted or composed.

The selected sensors/actuators and/or the selected sensitivity properties thereof can be weighted or ponderated (e.g. addition with weighs) or otherwise composed (e.g. by a linear or non-linear function). For example, in some embodiments, a particular weight can be attributed to each selected sensor/actuator (and/or property/moments thereof). For example, a distribution can consider the aggregation of three times accelerometer data plus with one time the variance of the gyrometer. In some embodiments, selected sensor/actuator (and/or selected moment thereof) can be "chained" or "linked" or "grouped" or "cascaded" in different ways. For example, the response of a first sensor can be taken as the input (or challenge) of a second one. Arrangements can comprise serial and parallel schemes (graphs of sensors/actuators).

In an embodiment, the circuit may be further configured to receive data from a source external to the computer device.

For example, in an embodiment, a SPUF according to the invention can comprise an accelerometer and a gyroscope in a smartphone. The associated method can comprise the steps of determining an appropriate API to communicate with the sensors and further removing the gravity impact of the accelerometer sensor, receiving the output of sensors, the smartphone being at rest, determining the statistical distribution of the output, determining parameters associated with the determined distribution (e.g. by determining statistical moments) and by merging the multiple distributions.

In an embodiment, the circuit may be further configured to filter and/or correct received data.

The pre-processing of data in particular can increase reliability. The SPUF core (e.g. circuit) for example can be part of a larger system comprising other components such as a cryptographic function (or hash function) to protect the output of the SPUF. In an embodiment, the SPUF according to the invention can be further protected by various mechanisms, including but not limited to watchdog and self-healing or self-protect mechanism. Correction functions or Error Correction Codes (ECC) also can be used to handle errors occurring during SPUF measures.

In an embodiment, the circuit may be further configured to control access to one or more sensors and/or actuators in the computer device.

In an embodiment, in order to increase protection of the SPUF against attacks such as a replay attack, one or more limits and/or controls can be configured regarding the access to raw measurements (outputs) of one or more sensors being part of the SPUF. Limitations and/or controls can be configured by software and/or hardware. For example, considering a smartphone authenticated by a SPUF using a camera sensor and another sensor, if the access to the interface controlling the hardware sensor is open or improperly controlled, then the SPUF theoretically can be hacked and further cloned (by capturing its output). As a countermeasure, it can be advantageous to limit access to this sensor (this can be achieved by modifying the API interface controlling the hardware sensor, by modifying the system authorizations or privileges, by configuring an upper limit of raw measurements).

In an embodiment, the sensor may be selected from the group comprising a pressure sensor, ultrasonic sensor, humidity sensor, gas sensor, motion sensor, acceleration sensor or accelerometer, displacement sensor, force measurement sensor, gyro sensor or gyroscope, temperature sensor, image sensor, video sensor, U.V. sensor, magnetic sensor, CMOS image sensor, a silicon microphone, Inertial Measurement Unit (IMU), pressure sensor, micro-mirror, radiofrequency sensor, magnetic field sensor, digital compass, oscillator, luxmeter or light sensor, proximity sensor, G.N.S.S. (e.g. G.P.S.), barometer sensor, Wi-Fi sensor, Bluetooth™ sensor, NFC™ sensor, pedometer, pulse oximetry sensor, heart rate sensor, and fingerprint sensor.

In an embodiment, the Synthetic Physically Unclonable Function device is further associated with one or more Physically Unclonable Function devices, selected from the group comprising a MEMS-based PUF, a silicon PUF (e.g. a SRAM PUF, a delay PUF), an arbiter PUF, a ring Oscillator PUF, a Loop PUF, a biometric PUF, an optical PUF, a coating PUF and a multifactor authentication PUF. A "human being" PUF or "biometric" PUF designates a PUF configured/designed to measure human body elements or traces such as saliva, iris, fingerprint, voice, typing sequences, etc. It may be seen as a specific sensor.

In an embodiment, at least one sensor is excited by at least one actuator. An actuator is not required as such by embodiments of the invention (an actuator provides excitation to/of a sensor; the presence of an actuator implies the presence of a sensor). The said sensor can be a sensor already used for other purposes.

In some embodiments, sensors and/or actuators can be involved independently as sources of data. In some embodiments, sensors and actuators can be "coupled". For example, in an embodiment, the response of an autofocus (actuator)

embedded in the computer device can be measured by a displacement sensor. Data stemming from this couple of hardware elements can be handled by the invention.

There is further provided a computer-implemented method comprising the steps of:
- receiving data from one or more sensors and/or actuators in a computer device;
- determining intrinsic noise for each of said sensors (and/or actuators);
- determining the distribution of said each intrinsic noise;
- selecting a combination of sensors (and/or actuators) based on determined distributions of intrinsic noises;
- determining a multivariate statistical (global) distribution associated with the combination of intrinsic noises of the selected combination of sensors (and/or actuators);
- determining an identifier from said global distribution of noise.

In an embodiment, the selections of sensors (and of actuators, if applicable) and/or moments thereof maximizes data entropy (and/or reliability).

There is disclosed a computer program comprising instructions for carrying out one or more steps of the method when said computer program is executed on a computer device.

FIG. 1 illustrates examples of steps of the method according to an embodiment of the invention.

At step 110, a plurality of sensors (e.g., accelerometer, magnetometer, camera, etc) is selected amongst available ones in a considered computing device.

The envisioned computing device may be a smartphone. However, the computing device can be alternatively any consumer electronics device such as a laptop, smart watch, virtual reality or augmented reality device, game console, television, any Internet of Things (IoT) device or the like, etc.

The selection of hardware sensors can be performed in several ways. In an embodiment, the selection can be performed to maximize entropy. In other embodiments, the selection can be performed to maximize one or more other criteria.

From the measures performed by the selected sensors, different sources (or attributes or properties) can be further selected therefrom.

For example, hardware sensors can be combined (with optional further software processing) to provide a calibrated measure (or deduce a new metrics). For this calibration purpose, such a combination can be named a "composite" sensor. Such a calibration can be advantageous to build a PUF function. In fact, a calibration can eliminate variation factors which can compromise properties of a PUF (e.g. uniqueness and reproducibility). In an embodiment, a calibrated accelerometer can be built by eliminating the gravity parameter or factor (which is determined by a gyroscope sensor for example) from the raw accelerometer's measurement. Therefore, a calibrated measure can be rendered independent of the latitude at which the measure is performed, thereby making the PUF function more reliable.

More generally, beyond calibration purposes, a plurality of sensors can be leveraged. For example, in an embodiment, the entropy property or quantity of a PUF can be improved (e.g. increased). Different sources of data can be used: when properly combined, a combination of sensors (sources of data) can lead to a global or unified source associated with maximal entropy.

The selection step 110 can be performed offline, i.e. be predefined or be performed once for all. For example, in an embodiment, a referenced model of a smartphone can be associated with an optimal pre-selection of sensors. In another embodiment, available and/or accessible sensors in the device are discovered locally and a selection is further performed (with local and/or remotely accessed criteria).

Merely increasing the number of hardware sensors does not necessarily lead to a stronger SPUF. For example, if the sensors are not equivalent (e.g. do not present the same probability, rate of uniqueness and reproducibility) the resulting SPUF may be in some cases biased by less accurate sensors responses. A strong SPUF may in some configurations present an excellent/usable uniqueness which can be based on one single unique sensor. The combination can be optimized to avoid an "unbalanced" SPUF.

In a development, the method may further comprise the step of varying the selection of sensors, for example by multiplying the number and/or types of sensors. A prior analysis of each type of sensor can be performed.

At step 120, for each selected sensor, there are further selected a plurality of relevant quantities to be measured. A sensor measures values in its environment. These values can have types or categories (e.g. depth, angle, speed, etc) and possibly a plurality of attributes or parameters (e.g. precision, confidence, tolerance, etc). For example, an accelerometer can measure values of X, Y and Z with a precision or +/− 5% in precision. One or more types/categories and/or attributes/parameters may be selected for a given sensor. Combinations of such selections—for example including functions (or any type, e.g. linear combination, analytical function or else)—can be determined. For instance, for an accelerometer, the sole measured values of X and 2*Y values can be selected.

Similarly to step 110, the step 120 can be performed offline, i.e. be predefined or be performed once for all. For example, in an embodiment, a referenced model of a smartphone can be associated with an optimal pre-selection of data subsets collected from sensors.

At the optional step 130, real measures are performed. In an embodiment, there is measured and collected or received a plurality of measurements over time, said measures being obtained so as to sample its noise distribution (distribution of random errors).

In some embodiments, predefined data filters and/or preprocessing steps can be performed prior to determine noise/random errors (e.g. filtering of sensors' data in excess of one or more predefined thresholds, a SPUF response with invariant and/or predefined bit values, an abnormality in the distribution of noise or a response being incoherent with other received responses, etc).

In an embodiment, measures may be performed "at rest, in order to "isolate" the sensor from its environment and to determine "intrinsic" and "extrinsic" properties.

For example, an accelerometer sensor can be characterized by leaving it untouched on a table during a sufficient time (typically 10 seconds).

Other sensors may require other isolation procedures. Some isolation procedures can involve the user of the computer device. Some other procedures can be performed without any involvement of the user or be transparent to said user (automated or automatic steps, performed by the computer device or a machine). Isolation procedures for example can comprise actions such as taking pictures in the dark, taking pictures of white walls (with or without flash), acquiring a video facing down a surface or obstructing the lens, vibrating the computer device and measuring said vibrations, performing specific gestures for leveraging accelerometer, gyrometer or compass, placing the computer device in a Faraday cage such a micro-owen, etc.

It should be noted that other embodiments may be implemented that do not necessarily strictly require an isolation of environmental influences. For example, by acquiring images several times in a row under constant and uniform illumination, the mean (first raw moment) of the voltage output values for each pixel of the camera can be computed. Selecting a pair of two different enough pixels and comparing the two associated pixel mean values, one output bit can be generated depending on the sign of the difference between the two values: such procedure can constitute a challenge and response pair (CRP) generation. The repetition of this comparison for another pair of pixels can allow to produce a digital signature of a given device for authentication or to generate a key for security purposes.

In some other embodiments, this "isolation" (or "eviction" or "cancellation" of the influences of the environment) can be obtained in several other ways. For example, not even requiring measures "at rest", real measures can be further corrected by signal post-processing.

At step 140, a frequency distribution of measured values is obtained for each sensor. Frequency distributions can be determined in several ways, including but not limited to by using histogram methods, kernel methods, computation of moments.

In statistics, a frequency distribution is a table which determines the frequency of various outcomes in a sample. Equal class intervals or unequal class intervals can be determined. A frequency distribution for a sensor is univariate (i.e. single variable). Statistics can be obtained (e.g. relative frequency, cumulative frequency, mean and median, measures of variability or statistical dispersion, such as the standard deviation or variance, etc).

At step 150, a multivariate frequency distribution is obtained.

In one embodiment, the simultaneous activity of a plurality of sensors (viewed as a global or composite sensor) is handled to determine a distribution (of random errors).

In some embodiments, various schemes can be used to specify the combination of sensors. Such schemes comprise the use of mathematical functions (e.g. from a mere aggregation of sensors to complex ponderation, e.g. linear or non-linear functions etc).

A distribution may be handled according to two different ways as described hereinafter.

A first way consists in plotting the Cumulative Distribution Function (CDF) of the distribution of the values obtained, wherein the distribution D is seen as random variable taking the values measures d0, . . . , dn−1.

Another way relies on the moments of the distribution.

At step 160, there is determined an n-bit identifier ("ID"). The ID can be a key or a codeword. By design, the determined identifier can be unique.

In some embodiments, steps 130 and 140 may not be implemented. For example, some, if not all, distributions can be known and retrieved from one or more manufacturers' databases. For example, an imaging sensor labeled IMX278 can be associated with product data specifications which can include its noise profile and properties. In some embodiments, a particular operator can analyze marketed third party sensors and maintain a centralized database of noise profiles.

In an embodiment, the method steps may be performed locally, i.e. without the need for external data. In such an embodiment, a user may follows steps displayed on the interface of a smartphone or mobile phone. In one of those steps, the user can be required to put the smartphone on a still surface, for example a table, and to await the completion of the noise profile determination.

In another embodiment, the presence of sensors in the device may be determined or otherwise known. Noise profiles data is retrieved and the method can be performed.

Figure 2:
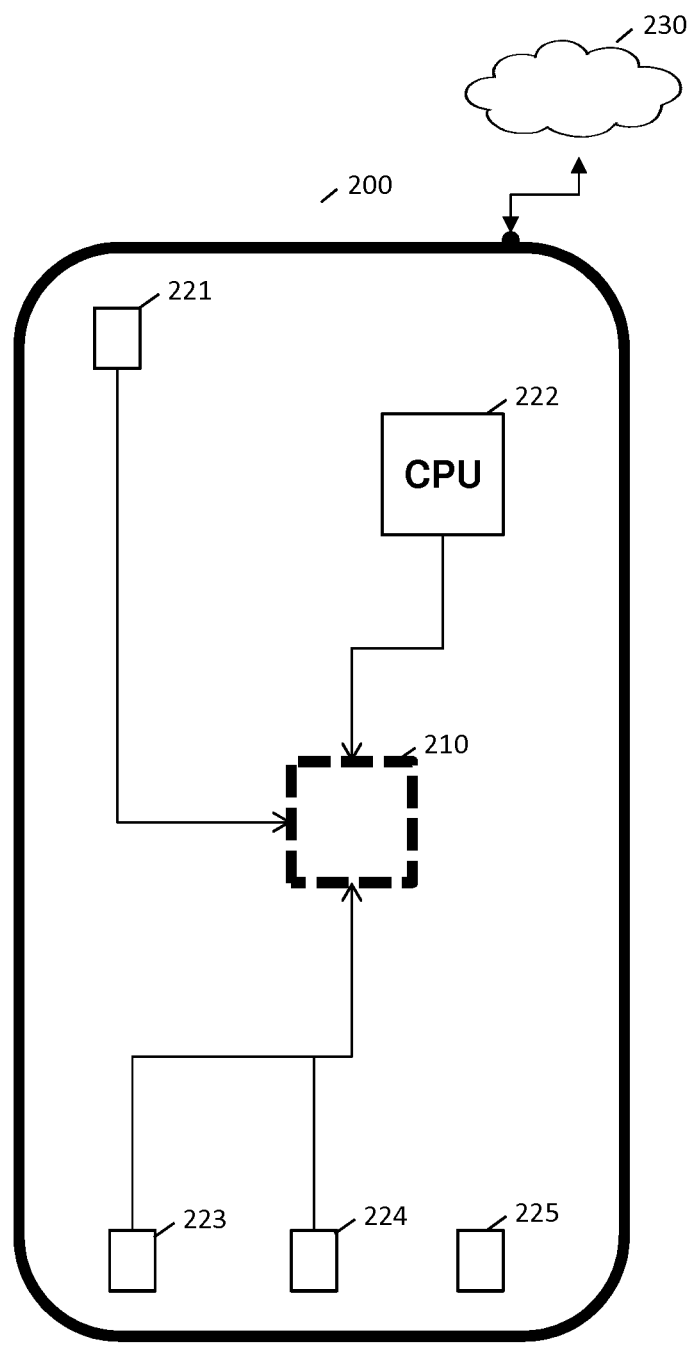
FIG. 2 shows a system view of an embodiment of the invention.

FIG. 2 shows a system view of the invention, implementing steps of the method.

The SPUF 210 may be defined by selecting sensors among a plurality of sensors (accelerometer 221, CPU 222, magnetometer 223, gyroscope 224 and microphone 225). In the example, the SPUF comprises the accelerometer 221, the magnetometer 223 and the gyroscope 224.

The SPUF 210 may be further characterized by determining a plurality of parameters. In particular, the noise (e.g. sensitivity to noise) is then characterized (e.g. by determining statistical moments, distribution profiles, etc). According to the invention, sensitivity to noise is considered as a rich source of information and as an advantage, unlike known approaches which consider noise as a drawback or limiting factor.

Among these sensors (221, 223, 224), particular values are selected. For example, wherein the accelerometer measures "Raw_Acceleration=Dynamic_Acceleration+Gravity=Scale" and "True_Acc+Offset", the SPUF according to the invention can consider only "Dynamic Acceleration" (or Linear Acceleration). Linear acceleration can be estimated manually (e.g. by Kalman filtering) and/or automatically (e.g. by calling other sensors to estimate the gravity, for example by using operating system's APIs which can deliver data). In the preceding example, the SPUF would advantageously not be affected by gravity (G-force vector).

To determine the noise profile (distribution), it can be for example sufficient to put the computing device embedding the considered sensors at rest during a few seconds (in such a case, the offset variation of the accelerometer is determined).

Further processing steps can be performed on the determined distribution of random errors.

The analysis of the distribution can comprise one or more of processing steps. Such steps for example comprise the steps of determining statistical moments, determining distribution shapes, determining ANOVA (analysis of variance). Other techniques and steps also can be used (e.g. machine learning, clustering, correlation analysis, high order statistics analysis, statistical hypothesis testing, etc).

In an embodiment, a general-purpose Central Processing Unit (C.P.U.) of a computer can be used to receive and process random errors, and/or to determine the distribution of noise/random errors. In an embodiment, a dedicated (or shared) co-processor) can be used. In some embodiments, both a C.P.U. and a coprocessor can be used.

In usual usages, the response to a challenge of a (standard) PUF must not be stored for security reasons: it is the core function of a (standard) PUF to be able to restitute a response given a challenge (the memory is "distributed" in the PUF hardware itself). Even further, it is generally (but not always) required for a standard PUF to not store the response separately (i.e. other than in or by itself). Yet in some embodiments of the invention, the SPUF according to the invention can be associated/coupled with a memory unit. In some embodiments indeed, noise profiles can be stored in a memory (e.g. a non-volatile memory), for example in order to determine and quantify its reliability over time. In some other embodiments, a volatile memory (e.g. SRAM) may be used (with flushing mechanisms).

In a development, a property of the quality of the SPUF associated with steadiness is determined by performing the steps comprising receiving a plurality of responses to challenges, storing and comparing said responses over time and determining one or more parameters associated with said steadiness quality.

Depending on embodiments, one or more steps of the invention can be performed by a user and/or can be performed by a machine (e.g. in an automated workflow).

In an embodiment, the SPUF is activable or activated without direct human intervention. According to some embodiments of the invention, the SPUF is available on demand, either by man and/or machine (e.g. some hardware and/or software elements can challenge the SPUF).

In an embodiment, the synthetic PUF according to the invention can be used as a global sensor to detect attacks. Indeed, if the environment of the device is changing (due to a malevolent attack who aims at creating faulty computations), then one or more sensors' properties might change. This can be monitored, and used to infer the likelihood of an attack. Such a usage of the synthetic PUF is useful, in that it allows to take advantage of it even when the functionality of the SPUF (generation of keys, seeding of pseudo-random number generators, authentication, etc.) is not needed, for another purpose.

In an embodiment, reliability maps can be used. For example, a step of quantifying the reliability of the SPUF can comprise the steps of determining a reliability map comprising one or more bit vectors, wherein a bit of said vector equals the value of 1 if a given challenge is determined as reliable in accordance with a predefined threshold and else equals the value of 0, and the step of comparing said computed map to a predefined reference map.

In an embodiment, the method further comprises one or more steps among revoking a sensor of the combination of selected sensors, disabling the S-PUF or emitting a notification or alert message.

Further embodiments are now described.

In a first step, sensors and/or actuators are enrolled. For available devices, several steps can be performed:
  selecting as many (actuator, sensor) pairs;
  exercising them in various conditions (when there is an actuator, the sensor can be detected in various conditions depending on the when the actuator behaves). For example, there can be performed operations of camera flashes combined with measures of decay of pixels. In an embodiment, a user can handle a smartphone so as to help isolating environmental factors. For example, by taking several successive pictures with uniform illumination, leveraging entropy of the internal camera, which is by essence unique to each smartphone, the user can authenticate or sign an email;
  collecting statistics about the measurements for one device, which allows to profile the noise (source of information, whose distribution is known, in addition to its dynamic in time);—collecting statistics across the devices.

In a second step, statistics can be collected or constituted ("big data" approach). At this step, there can be defined, for each kind of measurement, a "probability density function" (PDF) for many devices and many measurements per devices. Out of it, the measurements can be "orthogonalized" the, i.e., redundant ones can be removed and sorted out by decreasing inter-device "variance". A "chimera", i.e., a composite assembly of sensors/actuators can be defined, consisting in a weighted sum of various measurements, in order to have them orthogonal and with most information first (for example with largest "inter-device variance"). For each composite assembly, a reliability indicator (e.g. the "intra-device variance" (the noise for this device) can be determined.

In a third step, a key can be generated. Such a key can be determined for a given device. A key can be determined for a given objective (for example given by a user input), for example entropy of X bits (e.g., X=128) and reliability of Y (e.g., bit error rate of Y=10^{-9}).

In a further step, an amount of bits to extract can be allocated to each composite assembly, for example in proportion of its inter-device variance. A constraint can be that the total number of bits must equal that of the objective. This can determine "quantiles" in the PDF (for example 2 quantiles to extract one bit, 4 quantiles to extract two bits, etc).

In a further step, the composition (actuator, sensor) can be measured. While and if the reliability is not enough, the measurement can be repeated and accumulated, for example until the objective reliability is reached.

In a further step, it can be looked-up or determined, for each composition (actual, sensor) in which quantile of the PDF lays the device measurement. Then all of the bits, which yield an X bit string with targeted reliability Y can be concatenated.

The steps of the method according to some embodiments of the invention (e.g. selecting sensors, determining random errors, computing distributions of said random errors, determining identifiers) can be performed in different ways.

In space, some steps can be performed locally and/or remotely (e.g. in the smartphone itself, possibly with some steps being performed in the network or in the cloud). Local execution can involve (specific/dedicated and/or generic) hardware blocks, and/or software. Corresponding hardware circuits may be distributed within the computer device, or gathered in a specific circuit.

In time, some steps can be performed in the past (e.g. prior steps, "offline", etc) and/or in the present time (e.g. "online").

In an embodiment, the method according to the invention can be implemented by an entirely embedded hardware block. In an embodiment, the disclosed method can be performed by embedded hardware and software running on a local processor. Method steps indeed involve operations (and thus the flow of time) which are performed in certain tangible hardware which can either be custom hardware or local processor running embedded software. In other words, one or more hardware circuits can "embody" predefined method steps. For example, a block X can encode one or more steps as defined by the invention. From a technological perspective, the block can be intangible (i.e. does not evolve over time, at least not with intention) or can be reprogrammed. In an embodiment, SPUF parts are entirely hardware (e.g. embedded sensors). In an embodiment, a SPUF combines hardware and software.

Some embodiments of the disclosed invention can be entirely hardware embodiments. Some embodiments can be entirely software embodiments. Some embodiments can contain both hardware and software elements. The invention also can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A circuit for a Synthetic Physically Unclonable Function in a computer device, wherein the circuit is configured to:
   receive data from a plurality of sensors in the computer device;
   determine intrinsic noise for each of said sensors based on the received data;
   determine a distribution of each said intrinsic noise;
   select a combination of sensors from the plurality of sensors based on the determined distributions of intrinsic noises;
   determine a multivariate statistical distribution of noise associated with the intrinsic noises determined for the selected combination of sensors; and
   determine an identifier from said multivariate statistical distribution of noise.

2. The circuit of claim 1, wherein the circuit is further configured to select said plurality of sensors amongst sensors that are accessible in the computer device.

3. The circuit of claim 1, wherein the circuit is further configured to select one or more sensitivity properties selected in one or more sensors.

4. The circuit of claim 3, wherein the circuit is further configured to select one or more statistical moments in distributions of data originating from one or more sensors.

5. The circuit of claim 3, wherein said selection of sensors, and/or sensitivity properties, maximizes data entropy.

6. The circuit of claim 5, wherein the maximization is performed by machine learning.

7. The circuit of claim 3, wherein said selection of sensors, and/or sensitivity properties, maximizes reliability.

8. The circuit of claim 3, wherein selected one or more sensors, and/or sensitivity properties thereof, are further weighted or composed.

9. The circuit of claim 1, wherein the circuit is further configured to filter and/or correct received data.

10. The circuit of claim 1, wherein the circuit is further configured to control access to one or more sensors in the computer device.

11. The circuit of claim 1, wherein a sensor is selected from the group comprising a pressure sensor, ultrasonic sensor, humidity sensor, gas sensor, motion sensor, acceleration sensor or accelerometer, displacement sensor, force measurement sensor, gyro sensor or gyroscope, temperature sensor, image sensor, video sensor, U.V. sensor, magnetic sensor, CMOS image sensor, a silicon microphone, Inertial Measurement Unit (IMU), pressure sensor, micro-mirror, radiofrequency sensor, magnetic field sensor, digital compass, oscillator, luxmeter or light sensor, proximity sensor, G.N.S.S., barometer sensor, Wifi sensor, Bluetooth sensor, NFC sensor, pedometer, pulse oximetry sensor, heart rate sensor, and fingerprint sensor.

12. The circuit of claim 1, wherein the Synthetic Physically Unclonable Function device is further associated with one or more Physically Unclonable Function devices, selected from the group comprising a MEMS-based PUF, a silicon PUF, a SRAM PUF, a delay PUF, an arbiter PUF, a ring Oscillator PUF, a Loop PUF, a biometric PUF, an optical PUF, a coating PUF, an audio PUF, a vibration PUF, a Time-of-Flight PUF and a multifactor authentication PUF.

13. The circuit of claim 1, wherein the circuit is further configured to receive data from a source external to the computer device.

14. The circuit of claim 1, wherein a sensor in the computer device comprises an accelerometer sensor, and wherein said accelerometer is calibrated by elimination of the gravity parameter as received from a source external to the computer device.

15. The circuit of claim 1, wherein a sensor is excited by an actuator.

16. A computer-implemented method comprising the steps of:
   receiving data from a plurality of sensors in a computer device;
   determining intrinsic noise for each of said sensors based on the received data;
   determining a distribution of each said intrinsic noise;
   selecting a combination of sensors from the plurality of sensors based on the determined distributions of intrinsic noises;
   determining a multivariate statistical distribution of noise associated with the intrinsic noises determined for the selected combination of sensors; and
   determining an identifier from said multivariate statistical distribution of noise.

17. The computer-implemented method of claim 16, wherein the selections of sensors maximizes data entropy and/or reliability.

18. A computer program comprising instructions for carrying out the steps of the method according to claim 16 when said computer program is executed on a computer device.

* * * * *